United States Patent Office 3,013,042
Patented Dec. 12, 1961

3,013,042
METALLO ORGANIC COMPOUNDS
Sidney M. Blitzer and Tillmon H. Pearson, Baton Rouge, La., assignors to Ethyl Corporation, New York, N.Y., a corporation of Delaware
No Drawing. Original application May 6, 1958, Ser. No. 733,256. Divided and this application Aug. 25, 1959, Ser. No. 3,468
1 Claim. (Cl. 260—448)

This invention relates to the manufacture of metallo organic compounds and more particularly to alkyl aluminum compounds. This application is a division of our application Serial No. 733,256, filed May 6, 1958, which in turn was a continuation-in-part of our application Serial No. 501,746, filed April 6, 1955.

Up to the present time, only a select group of elements of group IV-A of the periodic table have been commercially important. Of these, the most important are lead, tin, carbon and silicon.

Very recently, a number of other alkyl metal compounds have become increasingly important commercially, e.g., triethyl aluminum, as intermediates in the manufacture of polyethylene and higher molecular weight alkyl compounds. The latter chemistry involves the build-up of alkyl groups by addition of ethylene, according to the following generalized equation:

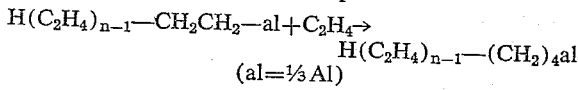

(al=⅓Al)

The trialkyl aluminum can also be displaced to give the hydrocarbon chain, as follows:

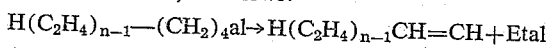

The products of this invention are very active for reactions of this type.

The commercial methods for preparation of the alkyl compounds of the group IV-A metals are not suitable for manufacture of alkyl aluminum compounds. Thus, the aluminum alkyl compounds must be prepared by processes only suitable as laboratory techniques. The principal method for their preparation is a Grignard process. Another laboratory technique is the reaction of mercury alkyl compounds with the desired metal or halides, producing the desired metal alkyl. As an example, dialkyl mercury can be reacted with aluminum to produce triethyl aluminum. Another method which shows promise involves the reaction of aluminum hydride with ethylene and other olefins to form aluminum triethyl and higher alkyl derivatives. However, due to the instability of aluminum hydride, the process must be carried out at temperatures below about 100° C. and preferably 90° C. Such low temperatures result in long reaction periods or low yields or both. In view of the commercial importance of these new compounds, an improved method for their economical and commercial production is in great demand.

It is accordingly an object of the present invention to provide an improved process for the preparation of aluminum trialkyl compounds. Another object is to provide an economical and convenient process of the above type using aluminum hydride which obtains high yields in relatively short reaction periods and in which little, if any, decomposition of the aluminum hydride occurs. Still another object is to provide a process involving a minimum of process steps. Yet another object of certain embodiments, is to provide a highly effective technique employing a plurality of reaction additives or reactants, and wherein the aluminum hydride is generated for the process. Such embodiments permit lower pressure operation and facilitate extended or continuous operations. Other objects and advantages will become apparent from the following description and appended claims.

We have now found that a wide variety of aluminum alkyl compounds can be readily and economically produced if aluminum hydride is reacted with an olefin at relatively high temperatures while maintaining the reactant under a hydrogen pressure of at least about 100 atmospheres, and preferably above about 300 atmospheres. Under these conditions, it has been found that exceptionally high yields and short reaction periods can be obtained and essentially no decomposition of the aluminum hydride is encountered. In continuing operations freshly formed aluminum hydride can be generated in situ as detailed hereafter. When aluminum hydride is to be formed in situ, it is found that the catalysts, especially active forms of alkaline reacting metal, and preferably in the presence of appreciable quantities of alkyl aluminum compound, permit formation of additional aluminum hydride and from this additional alkyl aluminum compounds at quite moderate pressures at a rapid rate. Hydrogen pressure can be used in the reactor up to about 700 atmospheres. One preferred range of hydrogen pressures is from 200 to 500 atmospheres. Normally, it is desired to employ enough olefin pressure to have sufficient olefin for the reaction, i.e., three moles of olefin per mol of aluminum hydride. The most preferred operation is obtained using super-atmospheric ethylene pressures. Preferred ethylene pressures range from one to 30 atmospheres. However, when fresh, additional hydrided aluminum is to be made in situ, hydrogen pressures of as low as 10 atmospheres, and preferably from 30 to 100 atmospheres, are desirably used.

The temperature of the process can range from about 100° C. to about 300° C. The higher temperatures in general require the higher hydrogen pressure in the ranges noted above. Preferred temperatures are between 125°–200° C. When aluminum hydride is formed in situ this preferred temperature range can be employed at the moderate pressure range of 10 to 100 atmospheres.

The reaction can be carried out in a solvent or in suspension. Ethers can be employed as well as hydrocarbons, such as hexane, octane, decane, toluene and xylene. Either aliphatic or aromatic ethers are suitable as solvents for the reaction. Typical examples are dimethyl ether, diethyl ether, dipropyl ether, dibutyl ether, methyl phenyl ether, dioxane and the like. In general, the solvent should have a different volatility from the alkyl aluminum product to permit easy separation of the reaction mixture. For this purpose, the solvent can be either more volatile or less volatile than the product.

The process can be carried out in either a batch or continuous operation. In most cases, continuous processing is desired for obvious economic reasons. The reaction time varies both with reactants and operating conditions. In general, reaction periods between about 30 minutes and several hours are normally required.

A wide variety of olefins are suitable for the present invention. In addition to ethylene, propylene, α-butylene, α-hexylene, styrene, α-dodecylene, cyclohexylene and other substituted and branched olefins are suitable. In some cases, mixtures of olefins can be employed to produce mixed alkyls. Preferably, when mixed alkyls are desired, the aluminum hydride is first partially reacted with one olefin to give the alkyl aluminum hydride and thereafter further reacted in subsequent steps with other olefins to complete the alkylation.

A catalyst is preferably employed in the process, and as already mentioned in certain forms of the invention it is found extremely beneficial to provide a plurality of additives which appear to result in a greater degree of reactivity of the principal reactants, thereby permitting low pressure operation at substantially the same temperature conditions. Typical examples of suitable catalysts which can be employed are the saline or alkaline reacting metals in active form, including, for example sodium metal, sodium hydride lithium metal, lithium hydride, sodium borohydride, zinc hydride, lithium aluminum hydride. Other active forms of alkaline reacting metals, in addition to the elemental metals, the simple and complex hydrides, are the alkyl compounds of such metals. Thus, sodium ethyl, lithium ethyl, ethyl calcium hydride, diethyl magnesium, isopropyl lithium, and diethyl zinc, are suitable examples of effective forms of active metals, although varying degrees of effectiveness are exhibited. The metal chlorides are also suitable, such as stannic chloride, magnesium chloride, zinc chloride and aluminum chloride. Certain of the elemental halides are useful, particularly iodine. The metal alkyls also catalyze the reaction. Typical examples of metal alkyls are triethyl aluminum, tributyl aluminum, trihexyl aluminum, diethyl magnesium and dibutyl magnesium. Metalloid hydrides of phosphorous, arsenic and antimony are also useful. The alkyl halides, particularly alkyl iodides such as ethyl iodide are effective. In some cases acidic catalysts such as boron trifluoride and combustions of boron trifluoride and hydrofluoric acid are also effective.

Typical examples of multi-component reaction systems are active forms of alkali metals in conjunction with alkyl aluminum material. Thus, illustrative pairs of these materials are sodium hydride and triethyl aluminum as such, sodium aluminum hydride and triethyl aluminum, sodium borohydride and triisopropyl aluminum, lithium aluminum tetrahydride and diethyl aluminum hydride, sodium metal and triethyl aluminum. In all the above pairs, aluminum metal can also be present, preferably in a highly subdivided form for most effective performance, to provide for additional aluminum hydride and hence aluminum alkyls.

Typical examples of alkyl aluminum compounds which can be produced by the present process are triethyl aluminum, tripropyl aluminum, tri n-butyl aluminum, tri isobutyl aluminum, tri n-hexyl aluminum, trioctyl aluminum, tricyclohexyl aluminum, tri-B-phenyl-ethyl aluminum, dimethyl ethyl aluminum, diethyl propyl aluminum, methyl ethyl butyl aluminum and the like.

The following are typical examples illustrating the present invention but these examples are not intended to in any way limit the same.

*Example I*

Thirty parts of aluminum hydride is dissolved in 200 parts of hexane and placed in a high pressure bomb and sealed. The latter is then pressurized with pure, dry ethylene (60 parts) sufficient to give a pressure of 10 atmospheres when heated to a temperature of 180° C. and with sufficient pure, dry hydrogen to give a pressure of 400 atmospheres at a temperature of 180° C. The bomb is brought up to reaction temperature (180° C.) and maintained at reaction temperature for 4 hours, at which time the reaction pressure is essentially constant. After cooling, the hydrogen and excess ethylene are vented, the bomb is opened, and the contents are decanted, under an atmosphere of dry nitrogen, into a receiver fitted for distillation. The solvent is stripped off and the triethyl aluminum product distilled at reduced pressure, all in an atmosphere of dry nitrogen or other inert gas. The triethyl aluminum is a colorless mobile liquid.

*Example II*

Example I is repeated except that the ethylene and aluminum hydride are reacted in diethyl ether solvent at a temperature of 80° C. and under 30 atmospheres pressure, in the presence of hydrogen at a pressure of 200 atmospheres. Also, 0.5 part of sodium borohydride is employed as catalyst. The triethyl aluminum product is recovered in excellent yield and is effective when used in many Grignard-type reactions.

Aluminum hydride, as used in the claim, includes the use of mixed hydrides. Particularly useful in this invention are the alkali metal-aluminum hydrides such as lithium aluminum hydride, sodium aluminum hydride, potassium aluminum hydride and cesium aluminum hydride. The following example illustrates the use of a mixed hydride in the process of this invention.

*Example III*

Example I is repeated, except that lithium aluminum hydride is reacted with propylene using toluene as the solvent at 90° C. and 400 atmospheres pressure. In this example, 0.5 part of triethyl aluminum is employed as a catalyst. The product is a mixture of tripropyl aluminum, propyl lithium, and lithium aluminum tetrapropyl.

As already indicated the employment of a plurality of catalytic materials, in conjunction with aluminum metal permits rapid and effective generation of aluminum alkyls and consumption of aluminum metal. This is illustrated by the following example.

*Example IV*

One part of sodium hydride and 32 parts of triethyl aluminum, liquid, were added to a reaction vessel. In addition, 8 parts of finely divided aluminum powder were inserted. The reactor is closed, and pure dry ethylene pressure is applied, of the order of about 10 atmospheres. In addition, a partial pressure of hydrogen amounting to about 70 atmospheres is applied, and the so formed system heated to about 130° C. The hydrogen and ethylene pressures were maintained by further additions as required. After a period of less than an hour, the temperature of the system is reduced to about 80° C. and the excess gases are vented. A rapid take up of hydrogen and ethylene are experienced resulting in formation of substantial quantities of additional alkylated aluminum.

The foregoing examples are susceptible of a large number of variations and modifications, some of which are described below.

In Example I when α-butylene, α-hexylene, α-dodecylene, styrene, or cyclohexylene is employed, similar results are obtained, except that the higher aluminum alkyls are formed. Non-α-olefins, that is, olefins which do not contain a terminal double bond, can also be used in Example I but, in general, they react much more slowly than the α-olefins.

Other solvents or suspensions can be used in the above examples, if desired. When ethers, such as dimethyl, dipropyl, dibutyl, and methyl phenyl ethers, and dioxane, and hydrocarbons, such as isooctane, decane, dodecane, benzene, and xylene are used in Example I, similar results are obtained.

Many other substances can be employed as catalysts in Example II. Results similar to those reported in this example are obtained when sodium hydride, lithium hydride, lithium aluminum hydride, zinc hydride, stannic chloride, magnesium chloride, zinc chloride, aluminum chloride, iodine, tributyl aluminum, trihexyl aluminum, tricyclo-hexyl aluminum, diethyl magnesium, dibutyl magnesium, phosphine, arsine, stibine, ethyl iodide, boron trifluoride, or hydrofluoboric acid is used.

When the process includes formation of aluminum hydride in situ, substantial quantities of alkyl aluminum compound is preferably maintained in the reaction system, as in Example IV. This alkyl aluminum compound may be the same as or different than the desired product, but is preferably the same compound. Similarly, appreciable variation in the catalysts or additives is feasible. Thus lithium hydride, ethyl lithium, calcium metal and other active forms of alkaline reacting or saline metals can be substituted for sodium hydride. The relative proportions of hydrogen and ethylene partial pressures can also be varied during the course of reaction if desired, the ethylene partial pressure, for example, being increased toward the end of a batch operation.

Furthermore, the temperature, reaction pressure, and ratio of reactants specified above can be varied within the stated limits. For example, temperatures of 100°, 225°, and 290° C., hydrogen pressures of 50, 300, and 600 atmospheres, and olefin pressures of 1, 15, and 30 atmospheres give similar results.

We claim:

In a process for producing an alkyl aluminum compound by reacting aluminum hydride with an olefin, the improvement which consists of conducting said reaction at a temperature between about 100° C. and 300° C. for a reaction period of less than four hours while maintaining the reactants under hydrogen pressure of between 100 and 700 atmospheres.

References Cited in the file of this patent

UNITED STATES PATENTS

| | | |
|---|---|---|
| 2,699,457 | Ziegler | Jan. 11, 1955 |
| 2,826,598 | Ziegler | Mar. 11, 1958 |

FOREIGN PATENTS

| | | |
|---|---|---|
| 917,006 | Germany | Aug. 23, 1954 |